Sept. 1, 1925.
I. J. QUINN ET AL
1,552,343
DRIVE SHAFT PINION ATTACHING MEANS
Filed Jan. 25, 1923
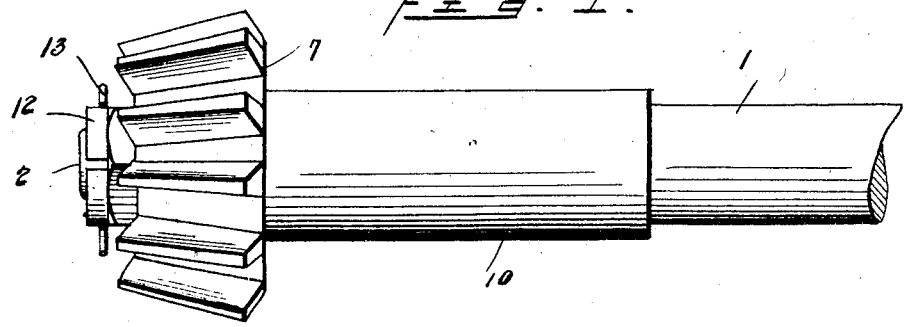
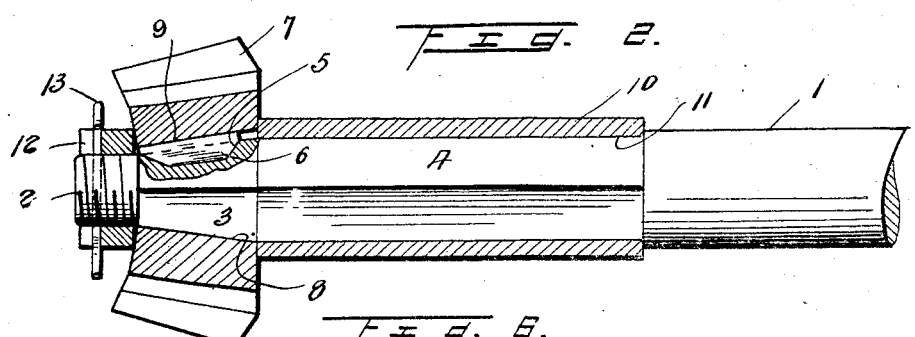
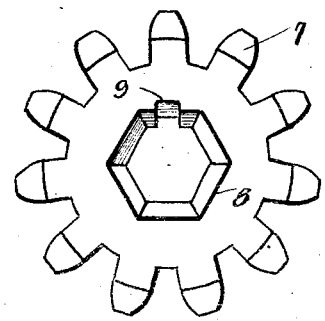
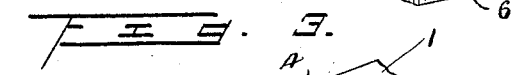
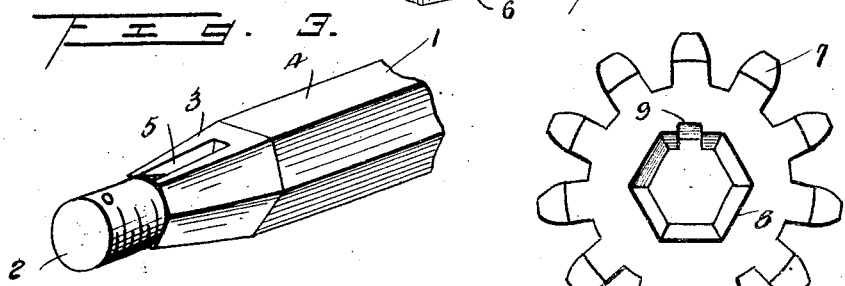
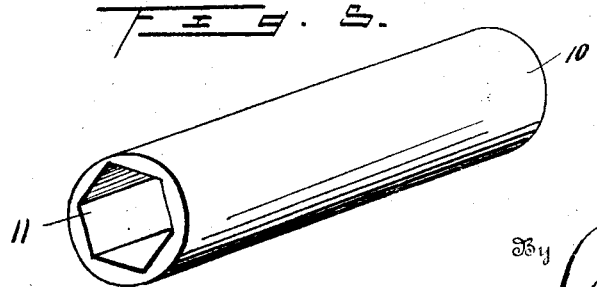
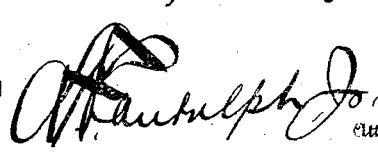
Inventor
I. J. Quinn & M. Quinn,
By
Attorney Patented Sept. 1, 1925.

1,552,343

UNITED STATES PATENT OFFICE.

ISAAC J. QUINN AND MARION QUINN, OF BEULAVILLE, NORTH CAROLINA.

DRIVE-SHAFT PINION-ATTACHING MEANS.

Application filed January 25, 1923. Serial No. 614,895.

*To all whom it may concern:*

Be it known that we, ISAAC J. QUINN and MARION QUINN, citizens of the United States, residing at Beulaville, in the county of Duplin and State of North Carolina, have invented certain new and useful Improvements in Drive-Shaft Pinion-Attaching Means; and we do hereby declare the following to be a full, clear, and exact description of the invention, such as will enable others skilled in the art to which it appertains to make and use the same.

The invention has for its primary object the securing of a drive pinion to the drive shaft of power transmitting means such as generally provided for motor vehicles and automobiles in particular.

One of the main objects of the invention is to prevent any possible turning or loosening of the pinion after the same has been secured to the shaft, and also to provide the shaft with a sleeve for sustaining the wear of the roller bearings, said sleeve being mounted upon the shaft in a manner to prevent turning thereon.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a drive shaft and pinion assembled,

Figure 2 is a similar view, the pinion, sleeve and confining nut being in section, Figure 3 is a detail view in perspective of the pinion receiving end of the shaft, Figure 4 is a view of the pinion as seen from the large end, Figure 5 is a detail perspective view of the sleeve, and Figure 6 is a detail perspective view of the woodruff cotter employed in securing the pinion to the shaft.

Corresponding and like parts are referred to in the following description and designated in the several views of the drawings by like reference characters.

The numeral 1 designates the drive shaft which has an end portion 2 reduced and externally screw threaded and a tapered portion 3 adjacent and in the rear of the reduced end 2. The tapered portion 3 is of polygonal form and may have as many faces as preferred. A portion of the shaft adjacent the tapered part 3 is of polygonal form, as indicated at 4, and the faces thereof may correspond with the faces of the tapered part 3. A groove or channel 5 is formed in a side of the tapered portion 3 and constitutes a seat to receive a Woodruff cotter 6.

The drive pinion 7 has its opening 8 tapered and of polygonal form to match the tapered portion 3 of the shaft 1 and the opening 8 is provided in a side with a groove or channel 9 to receive the Woodruff cotter 6 and thereby assist materially in securing the pinion to the shaft.

A sleeve 10 which sustains the wear of the roller bearings is detachably fitted upon the shaft 1 has its opening 11 of polygonal form to correspond with the polygonal portion 4 of the shaft to snugly fit the same and prevent any movement of the sleeve after the parts have been assembled and properly secured. A castellated nut 12 is threaded upon the reduced end 2 of the shaft and serves to confine the pinion 7 and sleeve 10 and is prevented from loosening by means of a cotter pin 13.

What is claimed is:

A shaft having its power transmitting end tapered and of polygonal form in cross section, a reduced portion of the same form in cross section forming a continuation of said tapered end, a bearing sleeve having a polygonal bore fitted on said reduced portion, a pinion having a tapered bore of polygonal form fitted on said tapered end, one of the facets of the tapered end provided with a key recess, a key seated in said recess, the pinion provided with a key-way to receive said key, and means to secure the pinion on said reduced end.

In testimony whereof we affix our signatures.

ISAAC J. QUINN.
MARION QUINN.